(12) United States Patent
Liversage et al.

(10) Patent No.: US 8,333,829 B2
(45) Date of Patent: Dec. 18, 2012

(54) SPRAYABLE LIQUID EMULSION POLYMER COATING COMPOSITIONS

(76) Inventors: Robert Richard Liversage, Lebanon, OH (US); Leslie Jean Sebo, Arnold, MO (US)

(*) Notice: Subject to any disclaimer, the term of this patent is extended or adjusted under 35 U.S.C. 154(b) by 358 days.

(21) Appl. No.: 12/228,851

(22) Filed: Aug. 18, 2008

(65) Prior Publication Data
US 2010/0041772 A1 Feb. 18, 2010

(51) Int. Cl.
- C09D 5/00 (2006.01)
- C09D 5/08 (2006.01)
- C09D 5/14 (2006.01)
- C09D 4/02 (2006.01)
- C09D 133/00 (2006.01)

(52) U.S. Cl. .......... 106/14.05; 106/14.11; 106/15.05

(58) Field of Classification Search .......... None
See application file for complete search history.

(56) References Cited

U.S. PATENT DOCUMENTS

| | | | |
|---|---|---|---|
| 4,079,028 A * | 3/1978 | Emmons et al. | 524/507 |
| 4,133,913 A | 1/1979 | Moore | |
| 4,148,948 A | 4/1979 | Williams | |
| 4,184,991 A | 1/1980 | Scherman, III | |
| 4,274,933 A | 6/1981 | Kamada | |
| 4,522,986 A | 6/1985 | Short | |
| 4,581,090 A | 4/1986 | Snyder | |
| 4,703,080 A | 10/1987 | Shay | |
| 4,759,955 A | 7/1988 | Hsu | |
| 5,182,327 A | 1/1993 | Biale | |
| 5,250,609 A | 10/1993 | Kato | |
| 5,256,724 A | 10/1993 | Biale | |
| 5,314,945 A * | 5/1994 | Nickle et al. | 524/507 |
| 5,332,431 A | 7/1994 | Yokoi | |
| 5,344,636 A | 9/1994 | Miyata | |
| 5,376,705 A | 12/1994 | Leys | |
| 5,387,434 A | 2/1995 | Black | |
| 5,605,966 A | 2/1997 | Schular | |
| 5,750,269 A | 5/1998 | Park | |
| 5,910,535 A | 6/1999 | Smith | |
| 6,057,400 A * | 5/2000 | Kinney et al. | 524/591 |
| 6,121,439 A | 9/2000 | Kroon | |
| 6,187,851 B1 | 2/2001 | Netti | |
| 6,462,139 B1 * | 10/2002 | Das et al. | 525/329.9 |
| 6,531,537 B2 * | 3/2003 | Friel et al. | 524/497 |
| 6,630,522 B2 | 10/2003 | Kawasi | |
| 6,660,828 B2 | 12/2003 | Thomas | |
| 6,974,605 B2 | 12/2005 | Macris | |
| 7,230,051 B2 | 6/2007 | Gobelt | |
| 7,247,671 B2 | 7/2007 | Overbeck | |
| 7,399,350 B2 | 7/2008 | Rajaraman | |

OTHER PUBLICATIONS

Carr, C. (2005). PAINTS—water based. Encyclopedia of Analytical Science (2nd edition) vol. P, pp. 2-9.*
Lambourne, Ronald, & Strivens, T. (1999). Paint and surface coatings: theory and practice. William Andrew Publishing (2nd edition). pp. 3-6, 54-56, 160-162, 185-190, and 350-354.*
ROCIMA 63 Industrial Microbicide. Rohm and Haas Technical Data Sheet (Mar. 2005).*
Hellgren et al. Surfactants in water-borne paints. Progress in Organic Coatings 35 (1999) 79-87.*
BYK-023 Technical Data Sheet D201. BYK Additives & Instruments (Issue Apr. 2011).*
Dow Corning 65 Additive (Silicone Antifoams) Product Information (Form No. 25-302D-99) 1999.*
Dow Acrysol RM-2020NPR Product Information (Form 81A248) Jul. 1996.*
Dow Rhoplex AC-261LF Emulsion MSDS (Revised Mar. 13, 2009).*
DuPont Zonyl FSP Fluorosurfactant Product Information (Form H-49018-5) Sep. 2005.*
Rohm & Haas Acrysol TT-615 Rheology Modifier Product Information (Sep. 2005).*

* cited by examiner

Primary Examiner — Daniel Sullivan
Assistant Examiner — Peter Anthopolos

(57) ABSTRACT

Sprayable liquid emulsion polymer coating compositions comprised of polymer resin and a plurality of additives for the purpose of protecting, restoring, reconditioning, rejuvenating, and enhancing the color, luster and durability of a multitude of different newer and older substrate types. These coating and sealing compositions are anti-mold, anti-graffiti, they withstand temperatures up to, and most likely in excess of, 300 degrees Fahrenheit without compromising their structural integrity, and they protect against the substrate-degrading effects of oxygen, ozone, UV-radiation, moisture and dry rot. They are also environmentally and user-friendly because they comprise minimal amounts of hazardous constituents.

3 Claims, No Drawings

SPRAYABLE LIQUID EMULSION POLYMER COATING COMPOSITIONS

FIELD OF THE INVENTION

The present invention relates to surface protective coatings and more specifically to anti-mold, anti-graffiti coatings that also protect the substrate from the surface-degrading effects of moisture, oxygen, ozone and ultra-violet radiation, and that often enhance the color and luster of newer items, and often restore the color and luster on older, weathered items. These coatings withstand temperatures in excess of 300 degrees Fahrenheit without blistering, cracking, peeling or yellowing. The enhanced leveling properties of these coatings are such that, even when applied by brush or roller, they cure to an essentially mirror-smooth final film. The preferred embodiments of this invention that do not comprise fillers and/or hiding agents are easily removed from the substrate using a mild organic solvent, including but not limited to, denatured alcohol and isopropanol. These coatings are appropriate for use on a multitude of different substrate types.

BACKGROUND OF THE INVENTION

The surfaces of many materials and items are susceptible to weathering and breakdown due to one or more of the following: oxygen, ozone, moisture, UV radiation, and/or attack from various types of microorganisms. The resultant surface and structural degradation usually takes the form of either corrosion (oxidation, including rusting), bleaching, chalking, dry rot, cracking, blistering, peeling, yellowing or water damage. Restoration is traditionally along the line of costly and labor-intensive repair or replacement.

The present invention offers a simple and cost-effective alternative. The films formed by the preferred embodiments of the present invention form a flexible, durable, resilient, and air, moisture and UV-resistant barrier that also inhibits microorganism infestation, and they maintain their structural integrity to temperatures up to, and potentially in excess of, 300 degrees Fahrenheit. Consequently, application of the present invention to surfaces before serious degradation has occurred will significantly extend the longevity of said surfaces. Also, the preferred embodiments that cure to a clear and colorless final film have the added benefit of partially-to-fully restoring the color and luster on older, weathered surfaces, and enhancing the color and luster on newer surfaces.

U.S. Pat. No. 4,184,991 describes an invention that is a corrosion inhibitor for use on ferrous metal substrates, and is based on benzotriazoles, tolytriazoles, substituted benzotriazoles and substituted tolytriazoles, all of which are well known corrosion inhibitors. The limitation of the composition disclosed in this patent, relative to the present invention, is that it is limited to this single type of application.

U.S. Pat. No. 4,581,090 describes a two part system comprising an adhesive material, such as a varnish, and a granular material, such as sand, onto an imperfect or weathered surface such as a vinyl roof top, roofing material, and siding and building structures. The purpose of this invention is to recondition the surface for long life, and to produce a like-new appearance. The invention described in this patent is more cost and labor-intensive to apply than the present invention, requiring a separate reservoir and a compressed air means to apply the granular material, and requiring that the adhesive material and the granular material be applied to the substrate in multiple and alternating layers. Also, the final finish obtained has a rough texture versus the present invention, which produces a smooth, satin-to-shiny final film. Another limitation of the invention disclosed in this patent, relative to the present invention, is that it is limited to these few types of applications.

U.S. Pat. No. 4,274,933 describes a restorative-type invention for use on organic glass plates, light fixture covers, optical lenses, eyeglass lenses, mirrors, etc., to repair scratches on said items. These are not intended uses of the present invention.

U.S. Pat. No. 4,759,955 describes an invention for the purpose of enhancing and renovating the appearance of vinyl fabrics and coverings. Vinyl items exposed to sunlight and the elements tend to oxidize, causing them to loose color and luster, and become chalky. This composition is also able to fill small cracks and openings, thus preventing moisture and other materials from passing through. A disadvantage of the invention described in this patent is that it comprises toluene, which is both environmentally and user-unfriendly. Another limitation of the composition disclosed in this patent, relative to the present invention, is that it is limited to this single type of application.

The invention described in U.S. Pat. No. 4,133,913 relates to a method for repairing cracks, cuts and other imperfections in plastic materials, and more specifically, on automobile dashboards and the like. The invention is capable of providing a textured finish, as necessary, in order to match the surface to which it is applied. The invention described in this patent is more labor-intensive than the present invention, requiring the application of three separate components: a filler, an acrylic resin lacquer, and a textured acrylic resin coating. In addition, a sanding step is required between application of the filler and the acrylic resin lacquer. Another limitation of the invention disclosed in this patent, relative to the present invention, is that it is limited to this single type of application.

U.S. Pat. No. 5,332,431 describes an antifouling (anti-microorganism) paint specific to marine applications and based on organocopper and organotin active ingredients. This patent application also cites three other antifouling coating compositions for aquatic use, described in patent application numbers 59344/90, 224452/62 and 127025/91 (all three are Japanese applications). The limitation of the inventions described in these three patents, according to the present inventor of U.S. Pat. No. 5,332,431, is that the active ingredient(s) are very water soluble, so are easily leached out of the coatings. This has harmful effects on the surrounding environment, and significantly shortens the life-span of the anti-fouling properties. Marine applications are not necessarily intended uses of the present invention.

The antifouling paint for marine use described in U.S. Pat. No. 5,332,431 claims to have overcome the above-mentioned leaching problems using an active compound consisting essentially of an alkylphenoxy group containing an organo silicon compound. Marine applications are not necessarily intended uses of the present invention.

U.S. Pat. No. 5,332,431 describes an anti-microorganism agent comprising various metal hydroxides. A disadvantage of this type of anti-mold agent, relative to the present invention, is that it imparts a white discoloration to the final film. Three of the preferred embodiments of the present invention form a clear and colorless final film, so any discoloration imparted by the anti-microorganism agent (or any other additive) would produce an aesthetically undesirable final result.

U.S. Pat. No. 5,332,431 states that some commercially available anti-mold agents tend to degrade the heat resistance and weatherability properties of coating compositions. Such is not the case with the anti-microorganism additive incorporated in the present invention.

All of the preferred embodiments of the present invention form surface-protective barriers that inhibit the substrate-degrading effects of oxygen, ozone, UV-radiation, dry rot and moisture. The films formed by these coating compositions inhibit corrosion (including rust), oxidation, bleaching, chalking, weathering, blistering, peeling, cracking, yellowing, water damage, and dry rot. They are anti-mold. They enhance the color and luster on newer substrates, and partially-to-fully restore the color and luster on older, weathered substrates. They are applicable to a multitude of different articles and substrate types.

Graffiti is an on-going and, especially in many urban areas, an often ubiquitous problem. This unsightly form of vandalism is especially pervasive on concrete structures, bridges, walls of buildings, buses, subway cars, trucks, and railroad box cars. The most common modes of application are flexible-tip permanent marking pens and canned spray paints that are typically oil-based. Millions of dollars are spent annually to remove or obliterate the graffiti and to restore the underlying surface.

One cost-effective method of dealing with graffiti problems is to apply a protective coating to the substrate which acts as a sacrificial film that prevents the migration of the graffiti through the film and allows for removal of the graffiti. Traditional alternative means of dealing with graffiti include painting over the graffiti, or performing a combination of: applying a paint remover such as methylene chloride, toluene or benzene, followed by power washing, followed by sand blasting or sanding. Scraping, hydro-sanding and hydro-blasting are also viable alternatives. All of these traditional alternative methods are more expensive and more labor-intensive. In addition, the means involving the use of organic solvents results in the release of harmful organic vapors which are detrimental to health, and the environment. Also, use of these relatively strong solvents, and sandblasting or sanding, may have a negative impact on both the structural integrity and aesthetics of the substrate. Also, all of the mechanical means have been found to etch and score, and therefore, make the surface porous and rough. Consequently, the surface is more susceptible to weathering, general deterioration and permanent staining. Sandblasting also often emits potentially carcinogenic and siliceous particles into the air.

Chemical methods for removing graffiti from both painted and unpainted surfaces involve the use of strong acids, strong bases, or volatile organic compound-type solvents. However, these methods are now being restricted because they are environmentally hazardous and pose a safety risk to the user. Also, repeated use tends to degrade several substrate types.

U.S. Pat. No. 4,241,141 describes a removable anti-graffiti coating. However, this invention requires special cleaning solutions to remove it. U.S. Pat. No. 6,187,851 describes a coating composition in which the graffiti can be removed either alone or with the anti-graffiti film. However, the recommended cleaning or film removing solvents include esters or ketones, such as acetone, methylethylketone, and ethyl acetate, which are harmful to both the user and the environment. U.S. Pat. No. 5,387,434 discloses another removable anti-graffiti coating. However, this coating requires power washing using pressures in excess of 250 psi, and preferably in excess of 1000 psi, and water temperatures between 120 and 194 degrees Fahrenheit to remove the coating. U.S. Pat. No. 5,750,269 describes another removable anti-graffiti coating. However, the films formed by this invention require the use of hot water or steam, in the form of a spray or jet, to remove the coating. The equipment required to remove the coatings formed by these later two inventions is expensive, cumbersome, and will require gasoline or a source of electricity to power said equipment.

U.S. Pat. No. 6,974,605 describes non-sacrificial anti-graffiti coating compositions. However, a special cleaner comprising N-pyrrolidone and a surfactant is required to effectively remove marker and spray paint-type graffiti from the films formed by these compositions. Also, the composition comprising water-based epoxy contains ether, which is both environmentally and user-unfriendly, and forms a film that is clear but is slightly yellow, rendering it aesthetically unsuitable for some applications. Also, the composition comprising aliphatic urethane contains a volatile organic compounds content that exceeds the mandated environmentally safe levels in some states, and so may be unsuitable for use in these areas.

U.S. Pat. No. 7,247,671 also describes a non-sacrificial coating invention. The recommended solvent for removing permanent marker-type graffiti is methyl ethyl ketone which, as described previously, is harmful to both the user and the environment.

U.S. Pat. No. 5,376,705 also describes a non-sacrificial invention that comprises a two part system that must be pre-mixed prior to application, and thus is not as convenient to use as a one component system. This invention also requires the use of special non-abrasive, non-acidic, non-caustic graffiti cleaners, such as described in U.S. Pat. No. 5,024,780. Some preferred embodiments contain toluene and xylene, which are both environmentally and user-unfriendly.

U.S. Pat. No. 5,910,535 describes a sacrificial-type anti-graffiti coating that can be effectively removed from the substrate using soap and water. However, all of these inventions are paint-type coatings; they form opaque films that effectively hide the substrate. The anti-graffiti preferred embodiments of the present invention form clear and colorless final films.

The anti-graffiti preferred embodiments of the present invention form clear and colorless final films that may be cleaned with a cloth moistened with water or a mild soap and water solution. If these means prove insufficient to effectively remove graffiti from the surface of the film, the graffiti and the coating itself may be effectively removed using a relatively mild, and user and environmentally-safe organic solvent such as ethanol, isopropanol, or denatured alcohol. These anti-graffiti preferred embodiments are suitable for use on a multitude of different articles and substrate types.

Films formed by latex paints are usually not entirely smooth, but often contain surface characteristics referred to as waviness and orange peel. Waviness is typical of brush application and orange peel is indicative of either roller or spray application. More often than not, these surface textures are unwanted, and detract from the aesthetics of the final finish. The degree to which surface structure is formed (i.e. no structural features versus fine structural features versus course structural features) depends on the nature of the composition, and is most affected by the types and relative proportions of: solvents, rheology modifiers (flow and leveling agents), fillers, pigments, hiding agents, defoamers, and surfactants.

A preferred embodiment of the present invention is a latex paint-type composition with enhanced leveling properties, such that, when applied to a smooth substrate with no surface texture, the final film formed by said latex paint-type preferred embodiment has an essentially mirror-like final finish, regardless of how the composition is applied (i.e. by brush, sprayer or roller). When applied to a substrate with surface features and/or textures, said features and textures will be imparted to the final, cured paint film.

U.S. Pat. No. 4,148,948 describes a water-dispersible paint of improved leveling characteristics comprising a substantial proportion of water. This composition is designed for fast, high temperature cures. This invention is only for use on plastic and metal articles, such as cans, and is applied to said cans using an expensive industrial-type, automated roller system. The present invention is suitable for use on a multitude of different substrate types, and using several modes of application, including rolling, brushing and spraying.

U.S. Pat. No. 4,522,986 relates to high solids urethane paint systems comprising urea flow control agents, said flow control agents added for the combined purposes of reducing sag while still promoting excellent leveling properties. This invention is sprayable and is used in automotive applications. The present invention has not necessarily been designed for automotive applications.

U.S. Pat. No. 4,703,080 describes a latex paint with enhanced leveling properties. This document mentions application of said paint composition by brush only, and does not cite any substrate or item types to which the invention is applicable.

Several patents were found that claim the leveling agent itself, and not an actual paint composition. U.S. Pat. No. 5,605,966 describes a leveling agent in the form of a microcapsule for use in heat-cured powder coatings. U.S. Pat. No. 7,230,051 relates to the use of block copolymers as leveling agents. U.S. Pat. No. 6,630,522 describes flow and leveling agents for paints and inks. U.S. Pat. No. 6,121,439 describes a water-soluble polysaccharide leveling agent for waterborne paints. U.S. Pat. No. 6,660,828 describes a polymer-type flow and leveling agent containing fluoro groups for use in waxes, polishes and coatings.

Two patents were found that claim a binder that enhances the flow and leveling properties of any paint system into which it is incorporated. In both, again, an actual paint composition is not claimed. These patents are: U.S. Pat. No. 5,182,327 and U.S. Pat. No. 5,256,724.

U.S. Pat. No. 7,399,350 relates to latex paint and printing ink compositions. None of the preferred embodiments of the present invention are printing ink compositions. The paint compositions described owe their enhanced leveling properties to the addition of disiloxane surfactant-type flow and leveling agents. The present invention comprises a polyurethane-based flow and leveling agent. A limitation of the composition described in U.S. Pat. No. 7,399,350 is that some preferred embodiments comprise aromatic solvents and ketones, both of which are environmental and user-unfriendly. The present invention does not comprise harmful or toxic constituents.

SUMMARY OF THE INVENTION

An object of the present invention is to provide anti-graffiti coating compositions which can be applied to protect painted and unpainted surfaces of all types from graffiti and other markings.

Another object of the present invention is to provide anti-graffiti, anti-mold coating compositions that have enhanced leveling properties, can withstand temperatures in excess of 300 degrees Fahrenheit without cracking, peeling, blistering or yellowing, often partially-to-fully restore the color and luster on older, weathered substrates and often enhance the color and luster on newer substrates, have enhanced leveling properties, and protect the substrate from the surface-degrading effects of moisture, UV-radiation, oxygen, and ozone, which are inexpensive to manufacture and environmentally-friendly and worker-safe to use, thereby requiring minimal protective clothing and respiratory equipment, said coatings having negligible volatile organic content.

A further object of the present invention is to provide anti-graffiti coating compositions which, when applied to a surface, form a graffiti barrier to render the surface substantially resistant to penetration by subsequent applications of graffiti and which can be easily removed using a mild, environmentally safe, and safe to use organic solvent, including but not limited to, denatured alcohol and isopropanol.

Another object of the present invention is to provide a method of protecting surfaces from graffiti by applying an anti-graffiti coating to the surfaces and, when needed, removing the coating in order to remove the graffiti and then reapplying a fresh anti-graffiti coating.

Another object of the present invention is to provide airtight, water proof and UV-resistant coating compositions that will protect the substrate from oxidation, corrosion (including rusting), water damage, dry rot, bleaching, chalking, cracking, peeling, yellowing, and microorganism infestation.

Another object of this invention is to provide water-based coatings that have anti-microorganism (antifouling) properties, and which have a high anti-microorganism effect when applied to all of the recommended substrates. In order to achieve the desired efficacy, the microbicide additive must achieve excellent dispersibility in the final cured film.

Another object of this invention is to provide preferred embodiments that are clear and colorless, and partially-to-fully restore the color and luster on older, weathered substrates, and enhance the color and luster on newer, relatively unweathered substrates.

Another object of this invention is to provide coating compositions that offer enhanced leveling efficiencies, such that, regardless of the mode of application employed (including brushing and rolling), an essentially mirror-smooth final film is achieved on all of the recommended substrates, provided that said substrate itself has a mirror-smooth surface.

Another object of this invention is to provide coating compositions that form films that will not blister, peel, crack, yellow or display any other signs of visible deterioration at all temperatures up to, and potentially in excess of, 300 degrees Fahrenheit.

The above and other objects of the present invention are accomplished using anti-mold, anti-graffiti compositions comprised of (a) polymer latex resin, (b) water, and (c) a plurality of additives. The member (a) is present in the compositions in an amount of from between 0.1 to 99.9% by volume and at an amount sufficient to form an anti-mold and anti-graffiti barrier on the surface to which it is applied. Any graffiti subsequently applied to the surface is prevented, by the anti-graffiti film barrier formed, from directly coming in contact with the substrate, and can be effectively removed, along with the film, as necessary, using a mild organic solvent such as denatured alcohol or rubbing alcohol. A fresh anti-graffiti coating can then be reapplied, as desired, to the clean substrate.

These coating and sealing compositions are for the purpose of restoring, renovating, protecting and enhancing the appearance of a multitude of different substrate types and objects, including but not limited to, vinyl, leather, latex and oil-based paints, metal, bare wood, stained or painted wood, lacquered or varnished wood, veneer, plastic, rubber, grout, caulking, concrete, brick, stone, stucco, fiberglass, ceramic tile, etc. Consequently, these compositions represent a considerable cost savings to the user by minimizing the necessity of repairs or replacement.

These compositions comprise polymer latex resin (binder), solvent, defoamer, surfactant, pigments, substrate-hiding agent, rheology modifiers, matting agent, anti-microorganism agent (microbicide), coalescing agent, binder dispersing agent, and pigment dispersing agent. As the solvent evaporates, the polymer resin and additives form a smooth, airtight and waterproof film that is flexible, resilient, and durable. The coating serves as a protective layer that tends to prevent rapid degradation of the enhanced appearance over a relatively long period of time.

The coating protects the substrate against mold, mildew and moss growth. The films formed by these compositions also inhibit corrosion (including rust), weathering, bleaching, fading, dry rot, and water damage. These compositions may be applied to substrates that get hot during normal use, such as automotive surfaces, because they will maintain their structural integrity to temperatures up to, and possibly in excess of, 300 degrees Fahrenheit. They protect the substrate from cosmetic damage due to accidental spills, food stains, dirt, and graffiti. Most types of cosmetic damage are effectively removed from the film using a cloth dampened with water or a mild detergent solution. If the stain can not be removed from the film, the film itself can be effectively removed from the substrate using a mild organic solvent such as denatured alcohol or isopropanol. The substrate can then be recoated with the present invention.

As far as the present inventor is aware, there are no prior art coating compositions that have the combined attributes of substrate color and luster enhancement and/or restoration, anti-mold, enhanced leveling efficiency, anti-graffiti properties, the ability to significantly extend the life of the substrate, cure in 10-20 minutes, are amenable to spray application and withstand temperatures in excess of 300 degrees Fahrenheit with no discernable degradation of any kind. Conventional clear-film-forming products such as varnishes and lacquers, and conventional paints, do not encompass all of the above-mentioned attributes.

U.S. Pat. No. 4,274,933 discloses the fact that the films formed by many acrylic polymer resin compositions readily become clouded when subjected to moisture. Such is not the case for the preferred embodiments of this invention.

Many polymer resin-based coating compositions comprise flammable and/or toxic organic solvents. Such is not the case for the preferred embodiments of this invention. Water is the primary solvent in this system. Only trace amounts of organic solvents are present in the polymer resin concentrates and the various additive concentrates.

When the present invention is applied to older, weathered substrates, the original appearance is virtually restored, enhancing its overall beauty. Moreover, the coating protects the underlying substrate from oxidation (including rusting, corrosion, bleaching, and fading), dry rot, water damage and even mild mechanical damage. The polymeric component of the coating compositions is chosen preferably from the class of thermoplastic polymers or copolymers generally referred to as acrylic polymers. Preferred materials include the aqueous polymer dispersions designated AC261, AC630, and HA16 and manufactured by the Rohm and Haas Company of Philadelphia, Pa. These aqueous dispersions contain approximately 50 percent polymer solids content by weight. When applying the polymer resins to a substrate in accordance with the present invention, it is usually preferred to dilute the commercially available compositions with additional solvent. The preferred solvent is water. The preferred polymer solids content in the working strength coating compositions of the present invention is in the range of 10% to 25% by weight. The films produced by these compositions are in the sub-millimeter-range thickness.

The films formed by three embodiments of this invention are colorless and transparent, thus enabling the user to enhance the visual characteristics of substrates having a variety of colors. A fourth embodiment forms a tinted and transparent film and thus allows for at least partial observation of the substrate surface textural characteristics. Typical uses of this fourth embodiment include, but are not limited to, wood items such as fences, decks, etc. A fifth embodiment forms tinted and opaque films that completely hide the substrate surface. All of these coatings also act as barriers, preventing moisture, oxygen and UV-radiation from penetrating to the substrate and causing subsequent degradation in the form of corrosion, fading, bleaching and/or moisture damage, depending on the nature of the substrate.

It has been found that these compositions can also be used as moisture barriers and gap filling sealers. When these compositions are applied to small cracks or openings, they bridge the crack or opening, thus closing it and preventing moisture or other materials from passing through. One viable use for this sealing characteristic is cracks in shingles. Other applications will be readily apparent.

SUMMARY

In accordance with the present invention, sprayable waterborne coating compositions with enhanced leveling properties comprising polymer latex resin, water, and a plurality of additives for the purpose of providing a protective, restorative, anti-mold, and anti-graffiti film barrier on a multitude of different articles and substrate types are described.

DETAILED DESCRIPTION OF THE INVENTION

The invention described in this application comprises formulas for the preparation of sprayable aqueous liquid emulsion polymer coating compositions. These compositions preferably comprise both aqueous and organic solvents. As of this filing, the organic solvents are preferably 1,2-propanediol, 2-n-butoxyethanol, and 2,2,4-trimethyl-1,3-pentanediol monoisobutyrate, and are most preferably 1,2-propanediol, and 2,2,4-trimethyl-1,3-pentanediol monoisobutyrate. All three solvents are clear, and colorless. 1,2-propanediol, and 2,2,4-trimethyl-1,3-pentanediol monoisobutyrate have minimal odor and toxicity, and are not considered hazardous materials (HazMats) as defined by the Code of Federal Regulations (49 CFR). However, it is anticipated that other solvents probably including, but not limited to, those in the alcohol, glycol, glycol ether, glycol ether acetate, phthalate ester, trimellitate ester, adipate ester, and ketone groups of organic compounds should produce functionally similar compositions. 1,2-propanediol, 2-n-butoxyethanol, and 2,2,4-trimethyl-1,3-pentanediol monoisobutyrate are preferably present in the final composition in the range of 0-99.9% by volume.

These compositions are waterborne emulsion polymer coatings. The organic solvents perform three possible functions: They act as coupling agents between the aqueous phase and the water-insoluble polymer molecules, promoting homogeneity between the two. As the compositions cure, they act as coalescing agents, fusing the polymer particles into a smooth, clear, continuous film that is both flexible and stretchable under ambient conditions. In the absence of a coalescing agent, the cured compositions are hard, brittle, and glass-like at normal room temperatures. And, the organic solvents serve as wetting agents because they have a lower surface tension than water.

Water serves as a diluting solvent. Water is cost-effective, non-toxic, non-hazardous, and chemically inert. However, it is anticipated that other solvents would probably produce functionally similar compositions. Water is added to lower the viscosity and increase the volume of the final compositions in order to achieve the desired consistency with respect to spreadability during application, surface coverage, and final coating thickness. Water is preferably present in the final compositions in the range of 0.1-99.9% by volume. Water is present in the preferred embodiments of this invention at an amount that also renders them amenable to application by spraying.

As of this filing, these compositions are preferably based on three commercially available aqueous liquid emulsion polymer mixes, Rhoplex HA-16, Rhoplex AC-630, and Rhoplex AC-261. These acrylic-based latex resin mixes are manufactured by the Rohm and Haas Company, Philadelphia, Pa. They are milky-white viscous liquids. These mixes comprise approximately 50% water, and 50% polymer by weight. A surfactant is present as a minor constituent. The polymer molecules are present in the form of colloidal-sized spherical particles that are coated with the surfactant. These three mixes contain most of the polymer solids that form the final surface film. Only the polymer and surfactant remain in the final cured composition. The water and organic solvents volatilize. However, trace amounts of organic solvent may remain.

The emulsion polymerization process is characterized by the formation of micelles. Micelles are colloidal-sized spheres, which are formed when a surfactant is dissolved in water above a certain critical concentration. When micelles are formed in the presence of dispersed monomer, monomer is absorbed and the micelles become swollen. When water-soluble free-radical initiators are added to the system, they are also absorbed by the micelles. Consequently, most of the polymerization process occurs inside of the micelles. The resultant colloidal spheres are referred to as polymer latex resin particles. The surfactant acts as an emulsifier, promoting miscibility between the hydrophobic polymer molecules and the aqueous phase.

Rhoplex HA-16 is preferably present in the final compositions in the range of 0.1-99.9% by volume. Rhoplex AC-630 is preferably present in the final compositions in the range of 0.1-99.9% by volume. Rhoplex AC-261 is preferably present in the final compositions in the range of 0.1-99.9% by volume.

It is anticipated that many monomers including, but probably not limited to, monomers in the acrylate/methacrylate class of monomers should produce functionally similar compositions. A presumably partial list of suitable starting monomers preferably comprises methyl acrylate, methyl methacrylate, ethyl acrylate, isopropyl acrylate, butyl acrylate, propyl methacrylate, ethoxyethyl acrylate, methoxyethyl acrylate, methoxyethyl methacrylate, ethoxyethyl methacrylate, butyl methacrylate, isobutyl methacrylate, lauryl acrylate, stearyl acrylate, acrylic acid, methacrylic acid, butanedioc acid, ethylene acetate, propylene acetate, vinyl acetate, vinyl toluene, styrene, butadiene, isoprene, isobutylene, acrylonitrile, and methacrylonitrile.

Nine different types of additives are also present in the preferred embodiments of this invention: defoamer, pigments, pigment dispersing agent, hiding agent and/or filler, microbicide, matting agent, rheology modifiers, wetting agent, and base. The emulsifier in the polymer resin promotes foam formation during application. If the foam does not dissipate, a clear, smooth final film will not be formed. Residual foam appears as white streaks on the surface. In order to minimize foam formation during application, and enhance foam dissipation before film formation, a defoamer has been added to the system. The defoamer is preferably a silicon-based defoamer, and most preferably Dow Corning 62 Additive or Dow Corning 65 Additive.

The film formed by this invention is inherently fungi (mold, mildew, and algae) resistant because it is water-resistant, which prevents the substrate from absorbing moisture. Fungi require a moist substrate to grow. However, a more aggressive approach to mold prevention has been employed by also adding a microbicide, also known as a biologically-active compound, also known as an anti-microorganism or antifouling agent. The microbicide is preferably Rohm and Haas Rocima 20, Rocima 63, or Rocima 80, and most preferably Rohm and Haas Rocima 63. However, it is anticipated that many of the commercially available microbicide additives would be compatible with this system, and would provide broad-spectrum anti-fungal properties.

Rocima 63 has three active ingredients, 2-n octyl-4-isothiazolin-3-one, methylbenzimidazole-2-yl carbamate and N'-(3,4 dichlorophenyl)-N-N-dimethylurea, for long-lasting performance against a broad range of fungi and algae. The physical properties of Rocima 63 are such that it will not cause yellowing or chalking, and it has excellent dispersibility when added to coating compositions.

Rocima 63 has two modes of protective action: 1) It prevents the treated surface from serving as the substrate for contaminating microorganisms to grow and proliferate. 2) When the surface becomes wet through rain or condensation, the controlled diffusion of the active ingredients into the wet phase prevents the growth of micro-organisms on the surface layer.

The preferred embodiments of this invention also comprise rheology modifiers, and a surfactant. The rheology modifiers chosen comprise both a flow and leveling agent, and a thickener or thickening agent. The addition of a thickening agent makes the composition more viscous. The advantages of a more viscous product are three-fold: 1) It promotes better (more even) wetting on smooth, non-porous substrates, on which a similar, but lower viscosity, water-based composition would tend to bead, analogous to the way water beads on a recently waxed and polished automobile. 2) It minimizes sag and drip on non-horizontal substrates. 3) Also, a thicker film is easier to achieve using a more viscous composition. An appropriate application for more viscous coating compositions is on smooth metal substrates.

The addition of a flow and leveling-type rheology modifier improves the flow characteristics of the composition during application, which, in turn, enhances leveling of the uncured film, resulting in a smoother final finish. The addition of a surfactant improves wetting (minimizes beading) and also enhances leveling.

The rheology modifiers are preferably polyurethane or acrylic type rheology modifiers, and are most preferably Rohm and Haas Acrysol TT-615, and Rohm and Haas Acrysol 2020NPR. The wetting agent is preferably a silicon or fluorocarbon-based wetting agent, more preferably Zonyl FSP and Zonyl FS 610, and most preferably Zonyl FS 610.

Tints are added to the system to give the final film color. Matting agent is added to produce a satin-to-matt final, cured film. Hiding agent is added for the purpose of making the final, cured film opaque. In the absence of tints, matting agent, and hiding agent, the final film is clear, shiny, and colorless. The hiding agent in the preferred embodiments of this invention is preferably titanium dioxide, and most preferably DuPont TiPure R706. However, other commercially available hiding agents should be compatible with these compositions, and should provide the desired level of opacity. All of the commercially available tint concentrates are suitable for use in this invention. All of the commercially available matting agents should also be compatible with this invention. When titanium dioxide is added to the system, in the absence of tint and matting agent, the final, cured film is opaque, white and shiny. When titanium dioxide and matting agent are added to the system, in the absence of tint, the final, cured film is opaque, white and satin-to-matt finish. As of this filing, the tints used in this invention are preferably the 'Series 2000 Dispersions' manufactured by Eagle Sales Company, St. Louis, Mo. As of this filing, the matting agent is preferably 'EZ Flat', also manufactured by Eagle Sales Company.

A tint dispersing agent has also been added to the preferred embodiments of this invention. The tint dispersing agent has been added for the purpose of ensuring that both the tint and the hiding agent disperse evenly in the composition so that an even and consistent amount of color and opacity is observed throughout the final film. The tint dispersing agent in the preferred embodiments of this invention is preferably an acrylic-type dispersing agent, is more preferably Rohm and Haas Tamol 731A and Tamol 165A, and is most preferably Rohm and Haas Tamol 731A. However, it is anticipated that many of the commercially available tint dispersing agents would be compatible with this invention, and would provide a level of dispersion consistent with an aesthetically pleasing final cured film.

The defoamer, pigment, pigment dispersing agent, hiding agent, microbicide, matting agent, rheology modifiers, and surfactant are preferably present in the final compositions in the range of 0-99.9% by volume. A base may be required, at an amount sufficient to raise the pH of the system to between 7 and 12 pH units for the purpose of stabilizing the system. At lower pH, one or more of the solids constituents may precipitate. The base is preferably a strong inorganic base, and is most preferably ammonium hydroxide.

All of the uncured compositions, when tint concentrate is excluded, look very similar to 2% milk with respect to color, and opacity. The two best mode embodiments (uncured) that do not comprise rheology modifiers are very similar to 2% milk with respect to viscosity also. The other three best mode embodiments (uncured) are significantly more viscous.

One best mode embodiment forms a final cured coating that is opaque and tinted. A second, best mode embodiment forms a final, cured film that is clear and tinted. The three remaining best mode embodiments form final cured films that are clear and colorless on the recommended substrates. The final films are either shiny, satin, or matt, depending on the amount of matting agent added to the system, the nature of the substrate, and the number of coats applied. All of these compositions produce final cured coatings that are resilient, durable, monolithic, and are not oily or slippery. All of these compositions, with the exception of the best mode embodiment for use as an automotive anti-graffiti coating, are anti-mold. All of these compositions, with the exception of the best mode embodiment comprising hiding agent and/or filler, are anti-chalk, and anti-fade. When two coatings of the lower viscosity, best mode embodiments are applied at a thickness that achieves complete coverage, but without running or dripping, they cure to a micrometer-range final thickness. The higher viscosity, best mode embodiments produce thicker final films than the lower viscosity, best mode embodiments.

If a matt final finish is preferred instead of the satin/shiny finish that is inherent of all five best mode embodiments described below, a matting agent may be added. The matting agent is preferably a wax or silica-based matting agent, and more preferably a silica-type matting agent, and most preferably EZ Flat. The matting agent is preferably present in the final composition in the range of 0-99.9% by volume, and more preferably present at 0% to 6% total solids content. When a matting agent is used, the water content in the composition is reduced by the volume-equivalent of matting agent concentrate added.

All of these compositions cure to a durable, flexible, stretchable, air tight, and waterproof plastic-like final coating. The cured compositions are non-toxic. The cured compositions protect the substrate from the surface-degradation effects of moisture, ozone, ultraviolet rays (UV), and oxidation. The cured compositions inhibit mold, mildew, algae, and moss growth. The cured compositions inhibit dry rot and water damage. Due to their malleable nature, the cured compositions will not blister, crack, chip, or peel, unlike most lacquers, varnishes, shellacs, and conventional latex paints. When applied to substrates on which surface-wear is anticipated, these compositions will wear instead of the substrate, thus extending the life of the substrate.

There are a number of highly suitable articles on which the coating compositions of the present invention are particularly attractive. These compositions are recommended for use on a variety of substrates and objects including, but not limited to, vinyl, leather, latex and oil-based paints, metal, bare wood, stained or painted wood, lacquered or varnished wood, veneer, plastic, rubber, grout, caulking, concrete, brick, stone, stucco, fiberglass, ceramic tile, etc. The compositions that comprise rheology modifiers are the better choice on smooth metal surfaces, and some types of new-looking, smooth-textured plastics, linoleum, and on freshly coated lacquered and varnished surfaces. On these types of substrates the compositions that do not comprise rheology modifiers tend to bead, and so do not always form a smooth, continuous film. However, these lower viscosity compositions may be used on these types of substrates when the item is older, and the surface has become weathered. On such surfaces, all of the best mode embodiments that cure to a clear and colorless final film will partially-to-fully rejuvenate both the color and the luster. The extent to which the color and luster will be rejuvenated will depend on the condition of the substrate at the time it is treated.

These compositions also will not yellow with age. These compositions will maintain their integrity on the recommended substrates at all temperatures ranging from zero to three hundred degrees Fahrenheit. It is anticipated that these compositions may maintain their integrity at even lower and higher temperatures than the range cited. However, this parameter has not been fully investigated.

These compositions should not be applied in direct sunlight during the heat of the day, or on surfaces that are hot or uncomfortably warm to the touch. Under these conditions, these compositions may dry too quickly, which may in turn compromise the appearance and/or structural integrity of the final cured composition. Also, do not apply the best mode embodiments that form clear and colorless final films when the temperature is below 40 degrees Fahrenheit, the best mode embodiment that forms an opaque and tinted final film when the temperature is below 50 degrees Fahrenheit, and the best mode embodiment used as an automotive anti-graffiti coating when the temperature is below 60 degrees Fahrenheit, or a proper film may not form and the finish may be hazy. When the air and/or substrate temperature is at or near the minimum recommended application temperatures, it is advisable to prepare a small test site first on the surface to be coated, to ensure that the desired finish will be attained.

To ensure proper adhesion and a smooth finish, the substrate should be clean, dry, and free of oils, wax or silicone-based finishes such as Pledge or Armor All, grease, soap film, dust, and dirt before applying. Appropriate cleaning solvents include, but are not limited to, soap and water, alcohol, ammonia-based window cleaners, etc. Any residue left by the cleaning solvent itself (for example, soap film) should also be removed. A high-pressure hose or pressure washer is recommended for cleaning large exterior surfaces. On coarse-textured horizontal surfaces such as concrete, the surface may still be damp when these compositions are applied. However, these compositions should not be applied on such surfaces when standing water is present.

Other embodiments of this invention preferably comprise other additives such as pigments (tints), hiding agents, dispersants, anti-blocking agents, fillers, adhesion promoters, accelerators, matting agents, surfactants, solvents, defoamers, rheology modifiers, preservatives, humectants, pH controllers, anti-freezes, coalescents, plasticizers, wetting agents, coupling agents, and microbicides.

General Specification

Now the subject of this patent application may be more generally described as follows: The liquid emulsion polymer coating compositions are comprised of twelve types of components, namely, polymer, a means of diluting the polymer, a means of making the final cured polymer coating more flexible and stretchable, a means of homogenizing all of the components in solution, a means of modifying the rheology of the uncured compositions, a means of minimizing foam formation and promoting foam dissipation during application, a means of wetting and leveling as the compositions cure, a means of adjusting the pH of the system, a means of adding color (tint) to the final, cured film, a means of effectively dispersing the tint(s) (pigment(s)) homogenously throughout the final, cured films, a means of making the final films opaque, thereby effectively hiding the substrate, a means of producing a satin or matt finish on the final, cured films, and a means of inhibiting fungal growth on the cured coatings and substrate.

The means of making the final coatings more flexible and stretchable is preferably a coalescing agent, and is more preferably an organic solvent. The means of diluting the polymer is preferably a liquid solvent and is most preferably water. The means of homogenizing these types of components in solution is preferably a surfactant, also known as an emulsifier. The means of inhibiting foam formation and dissipating foam formed during application is preferably a defoamer. The means of inhibiting fungal growth is preferably a microbicide. The means of modifying the rheology of the uncured compositions is preferably a rheology modifier. The means of causing the compositions to wet and level better during the curing process is preferably a surfactant. The means of altering the pH is preferably an acid or a base. The means of producing a matt final finish is preferably a matting agent. The means of making the final films opaque is preferably a hiding agent or filler. The means of adding color to the final, cured films is preferably a tint (pigment). The means of effectively dispersing the tint(s) (pigment(s)) homogenously throughout the final, cured films is preferably a dispersing agent.

The means of diluting preferably lowers the viscosity of the mixture and increases the volume of the final compositions. Lowering the viscosity is a means of making the final compositions easier to spread, and renders them amenable to various modes of application, including spraying. Increasing the volume is also a means of increasing the surface coverage, and achieving a more desirable thinner final coating. These compositions may also include a means of removing stains from the substrate surface. The means of stain removal is preferably a low boiling point organic solvent.

Other embodiments of these inventions preferably comprise a means of increasing the shelf life of the uncured compositions, a means of making the final film less tacky, a means of making both uncured and cured compositions more bulky, and a means of preventing the uncured compositions from denaturing if they freeze. The means of extending the shelf life of the uncured compositions is preferably a preservative. The means of preventing the uncured compositions from denaturing if they freeze is preferably an anti-freeze. The means of making the final films less tacky is preferable an anti-tack or an anti-blocking agent. The means of making the compositions more bulky is preferably a filler or an extender pigment.

Operation

These compositions are amenable to various modes of application, including, but not limited to, spraying, brushing, rolling, and wiping. Suitable spray applicators include plastic plant misters for small projects, and the larger pump-style compressed air or airless sprayers for broader surface area coverage. The residual droplet that often cures in the spray tip may be easily removed with a pin or other suitable implement. Various types of absorbent paper and cloth products may be used as wipe applicators. White cloth applicators are recommended because the dyes in colored materials may bleed and discolor the finish. Sponges may also be used. Wiping is only recommended on surfaces that are not abrasive enough to compromise the structural integrity of the applicator. Otherwise, small particles of the applicator material may end up stuck to the surface. Conventional paintbrushes and paint rollers are recommended for brushing and rolling, respectively. A clean broom is a suitable tool for spreading these compositions on rough horizontal surfaces such as asphalt and concrete.

When wiping or rolling these compositions, avoid employing a brisk scrubbing or buffing action, especially on smooth nonporous substrates such as painted garage doors, otherwise excessive foaming may occur which may not completely dissipate before curing. If the substrate is cool to the touch during application, any foam that forms should effectively dissipate. However, as recommended previously, avoid applying this composition in direct sunlight during the heat of the day. Smoother strokes with a thoroughly wetted applicator are recommended. If some white streaks persist after curing due to foaming, application of an additional coating using a thoroughly wetted applicator and a smoother applicating motion should resolve the problem. For this same reason, cloth and absorbent paper applicators may perform better than sponges, which also tend to promote foaming. Any residual foam 'blemishes' should partially-to-fully dissipate by weathering over time.

A very desirable attribute of these compositions is their relatively short curing time. Depending on the type, texture, and porosity of the substrate, and typical curing time variables including temperature, humidity, air flow over the surface, and the amount of headspace available for effective dissipation of solvent vapors, curing times of between ten and twenty minutes for the lower viscosity compositions, and between twenty and thirty minutes for the more viscous preferred embodiments not comprising hiding agent are typical for relatively smooth surfaces. On rougher horizontal surfaces such as asphalt, where some pooling is expected, longer curing times are anticipated. The preferred embodiment comprising hiding agent typically requires a few hours to properly set up and form a 'surface skin' that is dry to the touch. Unless otherwise stated, at least two coats are recommended for most uses of all of the best mode embodiments. The best mode embodiment designed for use as an automotive anti-graffiti coating has been formulated to be a one coat system when used for this application.

All of the best mode embodiments, with the exception of the one designed for use as an automotive anti-graffiti coating, are mold and mildew inhibitors. These compositions are not designed to eliminate existing mold and mildew problems. A separate treatment process must be performed first. When applied to a clean surface, these compositions have proven extremely effective at preventing mold and mildew growth. When applied to a surface with an existing problem, they will inhibit additional mold and mildew growth. Suitable applications include, but are not limited to, shower curtains, shower stalls, various other bathroom surfaces, most hard and soft wood substrates such as decks, fences, arbors, wood siding, and cabinets, painted surfaces, drywall, wooden structural members, basements, concrete, brick, rock, stucco, wood/vinyl sided building exteriors, shingles etc. These compositions will also inhibit water damage on wood substrates. These compositions will also inhibit moss growth, which usually occurs on outdoor surfaces, including but not limited to, concrete and brick, sidewalks, driveways, various types of roofing and siding materials, etc.

The best mode embodiment comprising tints, filler and/or hiding agent is suitable for use on all articles and substrate types on which most conventional latex paint products are applicable.

The best mode embodiment designed for use as an automotive anti-graffiti coating has been specifically formulated for use on high luster painted metal substrates, including but not limited to, automobile, truck, and railroad car exteriors, etc. On such surfaces, it will also restore both the color and luster on faded and worn substrates. The extent of rejuvenation will depend on the condition of the substrate at the time it is treated. In addition, paint, ink, marker, stain, food stains, dirt, etc. that are intentionally or unintentionally applied to a substrate coated with this composition will not migrate through the coating; they will remain on the surface of the film. To remove the unwanted discoloration, simply wipe the surface with a mild detergent and water solution. If this does not remove the discoloration, the film itself may be removed with a mild organic solvent such as ethanol, denatured alcohol or isopropanol, thus effectively removing the unwanted discoloration. Once sufficiently clean and dry, the surface can then be recoated with this best mode embodiment to again restore the color and luster, and to re-establish the anti-graffiti protection. Other substrates that this best mode embodiment may be used on include, but are not limited to, bare metal, oil and latex-painted substrates, wood, plastic, vinyl, stucco, concrete, brick, rubber, etc.

The preferred embodiments that form clear and colorless films restore the color, enhance the luster, and waterproof soft leather, and many hard leather items. Recommended uses include, but are not limited to, shoes and boots, belts, clothing items, purses, wallets, briefcases, luggage, saddles, car interiors, etc. However, because of the waterproofing property of these compositions, their application on leather surfaces will inhibit the leather's ability to 'breathe'. Consequently, discretion should be exercised when applying to clothing items such as shoes, boots, leather pants, leather skirts, and leather coats. As a recommendation, when applying to shoes and boots, treat only the heal and toe areas, and possibly the seams around the bottom of the shoes or boots, to about a half an inch up from the soles, in order to waterproof and prevent the threads from rotting. These compositions also seal in the leather's natural oils, which helps prevent the leather from drying out and cracking. Analogous to the exterior paint application cited above, these compositions have proven capable of partially-to-fully restoring faded color coatings applied to leather. Consequently, these compositions may be used in place of shoe polish, provided there is still a reasonable amount of substance to the color coating remaining on the substrate. The extent to which a surface is restored will depend on its condition at the time it is treated.

The best mode embodiment comprising tint is suitable for use on any porous, and many non-porous substrates where, in addition to the sealing, waterproofing and anti-mold properties, color is also desirable. A partial list of such substrates includes, but is not limited to, wood, rubber, plastic, vinyl, oil and latex-painted substrates, concrete, brick, stone, stucco, etc.

Analogous to the paint and leather uses previously cited, the compositions that form clear and colorless final films also minimize color fading on vinyl and plastic substrates, and are effective at partially-to-fully restoring weathered and bleached vinyl, linoleum, and plastic substrates to their original color and luster. The extent to which a surface is restored will depend on its condition at the time it is treated. Also, these compositions effectively seal in the plasticizers in these materials, which might otherwise migrate to the surface and either evaporate or wear off, leaving the substrate more susceptible to drying out and cracking. These compositions are recommended for use on both newer and older items, including but not limited to, car and boat interiors, motor cycle seats, indoor and outdoor furniture, awnings, Venetian blinds, vinyl siding, chairs, etc. These compositions will not blister, crack, chip, peel, or yellow, and will protect the surface to which they are applied from cracking as well. Consequently, as the coating itself weathers, as evidenced by a loss of luster and/or renewed color fading, a fresh coat may be applied to the cleaned surface with no additional surface preparation.

An applicable substrate that is susceptible to cracking is car dashboards. However, discretion is advised when considering this application because compositions that do not comprise matting agent will make the surface shinier, which in turn will increase surface-glare from the sun. Applying one coat instead of two may produce a more desirable result. Alternatively, a matting agent may be added, as described previously, in order to produce a lower-glare final finish. On items in which surface-wear is expected, such as car or motorcycle seats, these compositions will wear instead of the surface to which they are applied, thus extending the life of that surface.

The compositions that form clear, colorless final films rejuvenate and protect weathered interior and exterior painted surfaces, and protect freshly coated interior and exterior painted surfaces from weathering. Specifically, when applied to a painted surface that has become bleached and 'chalky' due to UV-induced oxidation, if there is still a reasonable amount of paint substance remaining, these compositions are capable of partially-to-fully restoring the surface to its original color and luster. The extent to which a surface is restored will depend on its condition at the time it is treated. When applied to either a recently painted or somewhat weathered surface, these compositions will extend the life of the paint. These compositions will not blister, crack, chip, peel or yellow, and will prevent the paint from cracking, chipping or peeling. Consequently, as the coating itself weathers, as evidenced by a loss of luster and/or renewed color fading, a fresh coat may be applied to the cleaned surface with no additional surface preparation. Also, a fresh coat of paint may be applied directly over these compositions without any surface preparation except cleaning, as necessary.

These inventions also inhibit the drying out, hardening, and cracking of rubber substrates. These degrading processes are caused by a UV-induced reaction between rubber and ozone. Such damaged rubber, in turn, is more susceptible to dry rot. Dry rot is a decay process caused by various types of fungi. Outdoor items that are exposed to direct sunlight are more susceptible to hardening and cracking. Items that are also exposed to moisture, including high humidity, are also more likely to develop dry rot. When applied to a substrate that has an existing dry rot problem, these compositions will prevent further damage. Suggested applications include, but are not limited to, tires and various other rubber items on automobiles, motor cycles, and bicycles, including wind shield wipers, gaskets, and seals, hoses, trailer and farm equipment parts, etc. Analogous to the vinyl and plastic applications, the embodiments that form clear, colorless final films also enhance the color and luster on new rubber surfaces, and are capable of partially-to-fully restoring the color and luster on older, weathered surfaces. The extent to which a surface is restored will depend on its condition at the time it is treated.

These compositions also inhibit corrosion and pitting on metal substrates. Corrosion or oxidation on metal surfaces is caused by a reaction between the metal surface, water, and oxygen. When using the best mode embodiments that form clear, colorless final films on tarnished surfaces, use an appropriate metal cleaner first, and then remove any remaining residue with alcohol, before applying these compositions. The higher viscosity, best mode embodiments are very effective on both smooth and brushed metal surfaces. The lower viscosity, best mode embodiments may not wet evenly on smooth metal substrates. When applied to surfaces that are already corroded, these compositions will effectively seal the substrate, thus preventing additional oxidation. When the compositions that form clear, colorless films are applied to rusty surfaces, the appearance of the coated substrate is often more aesthetically appealing than the original untreated and oxidized surface. Due to the malleable nature of these compositions, they will not blister, crack, chip, or peel in response to constant, temperature-induced expansion and contraction that is inherent of metal surfaces.

The lower viscosity, best mode embodiments, with and without tint, are effective deck sealants because they inhibit water damage, including mold, mildew, and dry rot, stains, and UV-induced bleaching on wood substrates. They also seal in the wood's natural oils, which helps prevent the wood from drying out and becoming brittle and splitting. The best mode embodiment that comprises tint also adds color to the final, cured film. Other suitable applications for these compositions include wooden fences, gazebos, arbors, natural wood siding, cedar shake shingles, etc. These compositions are suitable for application on all types of hard and soft wood, including teak and pressure-treated wood.

These sealing compositions minimize stain formation due to engine oils and various other automotive and machine lubricants on concrete and asphalt substrates. Three coats are recommended for this use. Allow preferably at least a one hour curing time between coats. The preferred embodiment comprising hiding agent should be allowed to cure for at least four hours between coats. Also, the final coat should be allowed to cure preferably over night before parking an automobile on the surface. Otherwise, the coating may end up stuck to the tires instead of the substrate. Note: Some automotive products, including certain brands of power steering pump fluid and brake fluid, contain organic solvents that will migrate through the coating. Consequently, spills and drips from these products should be wiped up quickly with a dry cloth or paper towel. Otherwise, a permanent stain may result.

The sealing, waterproofing, and anti-mold properties of the best mode embodiments comprising microbicide make them suitable coatings for basements. They will seal the pores and hairline cracks on concrete, cinder block, and mortar, thus preventing moisture from penetrating through basement walls and floors that are in good repair. Consequently, mold and mildew problems are minimized. The best mode embodiment designed for use as an automotive anti-graffiti coating may also be used to coat basements, but does not offer the anti-mold property. These compositions are not designed to repair separated, cracked, or chipped basement surfaces.

All best mode embodiments that do not comprise hiding agent are anti-chalk and anti-fade. The best mode embodiments that form clear, colorless final films restore the color and luster on worn and faded painted substrates, and protect new painted substrates from fading and becoming chalky. Consequently, these embodiments are useful for restoring and protecting metal roofs. Analogous to rubber, asphalt shingles, tarpaper, and various other roofing materials become brittle and crack with age. These compositions inhibit these UV-oxygen-induced weathering effects. Also, these compositions seal roof leaks. Recommended applications include, but are not limited to, asphalt, cedar shake, and metal roofs. Also, often pinhole-sized perforations form in metal roofs, possibly due to oxidation of the tiny metal impurities (i.e. other types of metals) within the surface. These compositions are effective at sealing holes that are less than approximately 1 mm in diameter. When a more liberal amount of the lower viscosity preferred embodiment compositions are applied in order to promote running, the fluid nature of these compositions allow them to 'find' and seal cracks that are less than approximately 1 mm wide, and holes that are less than approximately 1 mm in diameter. The preferred embodiments comprising rheology modifiers would be the more suitable compositions for sealing larger holes and seams. These compositions may also be applied to newer metal roofs to prevent perforations from forming.

These compositions protect surfaces from cosmetic damage caused by accidental spills or marks, and graffiti. These compositions resists penetration from common types of dirt, paint, felt marker, ball point pen, dyes, grease, oil, food stains, body oils, and even some acids, making cleanup much easier. However, some felt markers contain MEK, which is a strong solvent capable of etching the surface of the coating. Etching makes cleanup more difficult, and sometimes not possible. In such cases, the graffiti and the coating itself can be effectively removed from the substrate using a mild organic solvent such as ethanol, denatured alcohol or isopropanol. Stronger solvents like methyl ethyl ketone or acetone may also be employed. Once the graffiti and coating have been effectively removed, a fresh coating of this composition may be applied, as necessary.

These compositions protect surfaces from the damaging effects of freeze-thaw. Freeze-thaw occurs when water freezes in hairline cracks. When water turns to ice it expands, exerting pressure on the walls of the crack. This pressure, in turn, causes the crack to grow. As the cycle of freezing and thawing continues, the cracks will continue to grow. Coating the substrate while the cracks are still hairline-thickness prevents moisture from entering the cracks and initiating the freeze-thaw cycle. Applicable substrates include, but are not limited to, concrete, asphalt, and various types of shingles. These compositions are also effective at inhibiting the pitting effect that occurs when concrete driveways and walkways are salted in the wintertime. Salt pitting is also a freeze-thaw phenomenon.

The embodiments that form clear, colorless final films repair minor blemishes on wood furniture due to scratches or scuffs. Also, these compositions may be used to seal bare, stained, lacquered and/or varnished, and painted wood surfaces in order to prevent watermarks caused by moist flowerpots or condensation on cold drinking glasses, etc. As mentioned previously, if the lacquered or varnished surfaces are relatively new and very smooth, the preferred embodiments comprising rheology modifiers would probably perform better than the lower viscosity preferred embodiments, which would be less likely to wet evenly. Applications comprise both finished and unfinished items including, but not limited to, cabinetry, furniture, chairs, picture frames, shelving, etc. The compositions that form clear, colorless final films often enhance the color and luster of both treated and untreated wood surfaces. Unlike most furniture polishes, smudges and fingerprints will not form on the films formed by these compositions, even when applied to furniture. Also, they have 'anti-static' properties, and as a result, do not promote dust accumulation. These compositions will inhibit stain formation on unfinished wood surfaces.

The compositions that form clear, colorless final films protect and produce a nice finish on various types of sporting equipment including, but not limited to, golf clubs, wood, metal, fiberglass, and graphite composite surfaces on tennis racquets, firearms and bows, etc. Because these compositions are not oily and are relatively non-slippery, their application on these types of sporting goods will not compromise their performance. However, it is a matter of personal preference whether or not to apply these compositions on golf club and tennis racquet grips since they may alter the 'feel' of these surfaces. Similarly, discretion is advised with respect to applying to golf club faces.

The best mode embodiments that form clear, colorless final films protect, enhance the colors, and provide an aesthetically pleasing luster on newer or older picture frames, latex and oil-based paintings, and painted, lacquered, or bare, wooden and ceramic handcrafted items.

The best mode embodiments that form clear, colorless films also enhance the color and luster, protect, and waterproof hardbound book covers. Recommended applications include, but are not limited to, new or used high school and university text books, encyclopedia sets, dictionaries, etc. The extent to which a surface is restored will depend on its condition at the time it is treated.

These compositions are effective sealants for electrical components, circuit boards, wiring, automobile battery terminals, etc., that may be exposed to moisture and/or chemically corrosive environments. Once the solvents have evaporated and these compositions have cured, they are nonconductive.

The compositions that do not comprise hiding agent may also be used as waterproofing sealants for canvas and nylon fabrics because they are very flexible and will not crack, chip or peel. Applications include, but are not limited to, tents, pop-up camper canopies, awnings, automobile convertible tops, storage covers, etc. In addition, when such items or rolled up and/or placed in storage, the best mode embodiments that comprise anti-microorganism agent will inhibit mold and mildew growth.

These compositions are not recommended for use on moving mechanical parts. Do not apply over oil-based coatings that are not completely cured because any residual oil may otherwise compromise the appearance and/or structural integrity of the final cured coating.

These compositions are all water soluble until cured, which facilitates relatively quick and easy cleanup of spills, and all of the various types of applicators and receptacles that might be employed. These compositions are relatively safe and easy to use, and when cured, are all non-flammable, non-combustible, and non-toxic. These compositions are also never oily and are relatively non-slippery.

These compositions should be applied full strength; do not dilute. Surfaces that have been protected with these compositions should be cleaned with a damp cloth. If the surface has become stained, wipe with a mild detergent and water solution, rinse with water, and wipe dry. Avoid the use of abrasive cleaning products, mineral spirits, and organic solvents. Rubbing alcohol and denatured alcohol are the preferred solvents for the purpose of intentionally removing these compositions from a surface after they have cured.

Residual concrete that has partially-to-fully set on tools, receptacles, and vehicles is more easily cleaned off when the affected surface has first been treated with these compositions. Instead of having to use a mild muriatic acid solution to chemically treat the concrete stains, usually all that is required is spraying with a hose or a pressure washer.

Soap scum and water hardness spots don't form as easily on, and are more easily removed from, surfaces that are coated with these compositions.

The present invention will be explained in further detail by reference to a description of the preferred embodiments. The following examples illustrate but do not limit the invention. All proportions are expressed as percentages by volume.

DESCRIPTION OF THE PREFERRED EMBODIMENTS

Example 1

In a suitably sized, chemically inert receptacle, mix 47.7% Rhoplex AC-261, 39.4% water, 0.95% Tamol 731A, 0.03% Zonyl FS-610, 0.20% DuPont #65 Additive, 1.2% Rocima 63, 0.24% 2,2,4-trimethyl-1,3-pentanediol monoisobutyrate, 9.6% Acrysol RM 2020NPR, and 0.72% Acrysol RM TT615, until completely homogenous. Add between 0 and 180 ml of DuPont TiPure R706 titanium dioxide per gallon (added as a dry powder–tamped dry density=1.0 grams/milliliter). The actual amount added is dependant on the tint concentrate color that will be used.

Tint concentrate is added at the end, and is preferably added at an amount of between 0% and 10% of the sum total volume of all of the above-mentioned components, excluding DuPont TiPure R706, and is more preferably added at an amount of between 0% and 2.0% of the sum total volume of all of the above-mentioned components, excluding DuPont TiPure R706. EZ Flat matting agent is also added at the end, after the tint concentrate, at an amount preferably between 0% and 10% of the sum total volume of all of the above-mentioned components, excluding DuPont TiPure R706 and the tint concentrate, and is more preferably added at an amount of between 0% and 5.0% of the sum total volume of all of the above-mentioned components, excluding DuPont TiPure R706 and the tint concentrate. The amount of EZ Flat added is dependant on the amount of satin-to-matt finish desired in the final film.

Another preferred alternative mixing scheme for the EXAMPLE 1, best mode embodiment is as follows: In a suitably sized, chemically inert receptacle, mix 47.7% Rhoplex AC-261, 0.96% Tamol 731A, 0.03% Zonyl FS-610, 0.20% DuPont #65 Additive, 1.2% Rocima 63, 0.24% 2,2,4-trimethyl-1,3-pentanediol monoisobutyrate, 9.6% Acrysol RM 2020NPR, and 0.72% Acrysol RM TT615, until completely homogenous. Add between 0 and 300 ml of DuPont TiPure R706 titanium dioxide per gallon (added as a dry powder–tamped dry density=1.0 grams/milliliter) of concentrate. The actual amount added is dependant on the tint concentrate color that will be used.

Tint concentrate is added at the end, and is preferably added at an amount of between 0% and 16.5% of the sum total volume of all of the above-mentioned components, excluding DuPont TiPure R706, and is more preferably added at an amount of between 0% and 3.3% of the sum total volume of all of the above-mentioned components, excluding DuPont TiPure R706. EZ Flat matting agent is also added at the end, after the tint concentrate, at an amount preferably between 0% and 16.5% of the sum total volume of all of the above-mentioned components, excluding DuPont TiPure R706 and tint concentrate, and is more preferably added at an amount of between 0% and 8.3% of the sum total volume of all of the above-mentioned components, excluding DuPont TiPure R706 and tint concentrate. The amount of EZ Flat added is dependant on the amount of satin-to-matt finish desired in the final film. This concentrated mix can then be shipped at a reduced cost. The recipient then adds 39.4% water (percentage is based on the sum total of all percentages of constituents used to mix the concentrate composition, excluding the tint, TiPure R706, and EZ Flat), with stirring, until completely homogenous.

Example 2

In a suitably sized, chemically inert receptacle, mix 24.3% Rhoplex AC-261, 74.1% water, 1.2% Rocima 63, 0.25% 2,2,4-trimethyl-1,3-pentanediol monoisobutyrate, and 0.20% #65 Additive, until completely homogenous. Tint concentrate is added at the end, and is added at an amount preferably between 0% and 10% of the sum total volume of all of the above-mentioned components, and more preferably between 0% and 2.0% of the sum total volume of all of the above-mentioned components.

A preferred alternative mixing scheme for the EXAMPLE 2, best mode embodiment is as follows: In a suitably sized, chemically inert receptacle, mix 24.3% Rhoplex AC-261, 24.5% water, and 1.2% Rocima 63, until completely homogenous. In a separate suitable receptacle, mix 49.6% water, 0.25% 2,2,4-trimethyl-1,3-pentanediol monoisobutyrate, and 0.20% #65 Additive, until completely homogenous. Both of these intermediate compositions are indefinitely stable. In a separate suitable receptacle large enough to accommodate the total volume, combine the total contents of both intermediate mixtures, with stirring, until completely homogenous. The two intermediate mixtures may be decanted into the larger receptacle at the same time, or one at a time in either order, to prepare the final composition. Tint concentrate is added at the end, and is added at an amount preferably between 0% and 10% of the sum total volume of all of the above-mentioned components, and more preferably between 0% and 2.0% of the sum total volume of all of the above-mentioned components.

Another preferred alternative mixing scheme for the EXAMPLE 2, best mode embodiment is as follows: In a suitable receptacle, mix 24.3% Rhoplex AC-2612, 1.2% Rocima 63, 0.25% 2,2,4-trimethyl-1,3-pentanediol monoisobutyrate, and 0.20% #65 Additive, until completely homogenous. Tint concentrate is added at the end, and is added at an amount preferably between 0% and 40% of the sum total volume of all of the above-mentioned components, and more preferably between 0% and 8.0% of the sum total volume of all of the above-mentioned components. This concentrated mix can then be shipped at a reduced cost. The recipient then adds 74.1 % water (percentage is based on the sum total of all percentages of constituents used to mix the concentrate composition, excluding the tint), with stirring, until completely homogenous.

Example 3

In a suitably sized, chemically inert receptacle, mix 49.8% Rhoplex AC-261, (an all-acrylic emulsion polymer comprising about 50 % acrylic polymer and about 50 % water), 44.8 % water, 0.25% 2,2,4-trimethyl-1,3-pentanediol monoisobutyrate, 5.0% Acrysol RM 2020NPR (a nonionic, solvent-free, hydrophobically-modified ethylene oxide urethane (HEUR) rheology modifier), 0.10% Dow Corning RM #65 Additive (a water-based silicone defoamer), and 0.13% Acrysol RM-TT615 (a hydrophobically-modified anionic thickener), until completely homogenous.

Another preferred alternative mixing scheme for the EXAMPLE 3, best mode embodiment is as follows: In a suitably sized, chemically inert receptacle, mix 49.8% Rhoplex AC-261, 0.25% 2,2,4-trimethyl-1,3-pentanediol monoisobutyrate, 5.0% Acrysol RM 2020NPR, 0.10% #65 Additive, and 0.13% Acrysol RM-TT615, until completely homogenous. This concentrated mix can then be shipped at a reduced cost. The recipient then adds 44.8% water with stirring, until completely homogenous.

Example 4

In a suitably sized, chemically inert receptacle, mix 24.5% Rhoplex AC-261(an all-acrylic emulsion polymer comprising about 50 % acrylic polymer and about 50 % water), 73.9% water, 1.2% Rocima 63(the concentration of active ingredients in this aqueous microbicide dispersion is 30 % and the active ingredients are 2n octyl-4-isothiazolin-3-one, methylbenzimidazole-2yl carbamate and N'-(3,4dichlorophenyl)-N-N-dimethylurea), 0.25 % 2,2,4-trimethyl-1,3-pentanediol monoisobutyrate, and 0.20% Dow Corning RM 65 Additive (a water-based silicone defoamer), until completely homogenous.

A preferred alternative mixing scheme for the EXAMPLE 4, best mode embodiment is as follows: In a suitably sized, chemically inert receptacle, mix 24.5% Rhoplex AC-261, 24.3% water, and 1.2% Rocima 63, until completely homogenous. In a separate suitable receptacle, mix 49.6% water, 0.25% 2,2,4-trimethyl-1,3-pentanediol monoisobutyrate, and 0.20% 65 Additive, until completely homogenous. Both of these intermediate compositions are indefinitely stable. In a separate suitable receptacle large enough to accommodate the total volume, combine the total contents of both intermediate mixtures, with stirring, until completely homogenous. The two intermediate mixtures may be decanted into the larger receptacle at the same time, or one at a time in either order, to prepare the final composition.

Another preferred alternative mixing scheme for the EXAMPLE 4, best mode embodiment is as follows: In a suitable receptacle, mix 24.5% Rhoplex AC-261, 1.2% Rocima 63, 0.25% 2,2,4-trimethyl-1,3-pentanediol monoisobutyrate, and 0.20% 65Additive, until completely homogenous. This concentrated mix can then be shipped at a reduced cost. The recipient then adds 73.9% water, with stirring, until completely homogenous.

Example 5

In a suitably sized, chemically inert receptacle, mix 24.6 % Rhoplex AC-261(an all-acrylic emulsion polymer comprising about 50 % acrylic polymer and about 50 % water), 72.8% water, 1.2% Rocima 63(the concentration of active ingredients in this aqueous microbicide dispersion is 30% and the active ingredients are 2-n octyl-4-isothiazolin-3-one, methylbenzimidazole-2-yl carbamate and N'-(3,4dichlorophenyl)-N-N-dimethylurea), 0.25% 2,2,4-trimethyl-1,3-pentanediol monoisobutyrate, 0.01% Zonyl FSP (a flourosurfactant solution comprising 35% water-soluble anionic phosphate fluorosurfactant, 20% isopropyl alcohol, and 45% water), and 1.1% RM-TT615 (a hydrophobically-modified anionic thickener), until completely homogenous.

A preferred alternative mixing scheme for the EXAMPLE 5 best mode embodiment is as follows: In a suitably sized, chemically inert receptacle, mix 24.6% Rhoplex AC-261, 1.2% Rocima 63, and 24.2% water, until completely homogenous. In a separate suitable receptacle, mix 48.6% water, 0.25% 2,2,4-trimethyl-1,3-pentanediol monoisobutyrate, 0.01% Zonyl FSP, and 1.1% RM-TT615, until completely homogenous. Both of these intermediate compositions are indefinitely stable. In a separate suitable receptacle large enough to accommodate the total volume, combine the total contents of both intermediate mixtures, with stirring, until homogenous. The two intermediate mixtures may be decanted into the larger receptacle at the same time, or one at a time in either order, to prepare the final composition.

Another preferred alternative mixing scheme for the EXAMPLE 5, best mode embodiment is as follows: In a suitable receptacle, mix 24.6% Rhoplex AC-261, 1.2% Rocima 63, 0.25% 2,2,4-trimethyl-1,3-pentanediol monoisobutyrate, 0.01% Zonyl FSP, and 1.1% RM-TT615 until completely homogenous. This concentrated mix can then be shipped at a reduced cost. The recipient then adds 72.8% water, with stirring, until completely homogenous.

Anti-Mold Testing Example

In order to evaluate the efficacy of the anti-mold feature of the present invention under extreme conditions, one of the preferred embodiments that does not comprise tints, matting agent, filler and/or hiding agent was subjected to ASTM Method D4445-03, 'Standard Test Method for Fungicides for Controlling Sapstain and Mold on Unseasoned Lumber'.

In accordance with this method, two coats of the test composition were applied to pieces of unseasoned sapwood. As controls, test samples were also prepared with a similar test composition that did not comprise anti-microbial agent. Untreated pieces of unseasoned sapwood were also prepared. All of these test samples were then inoculated with spores from several types of fungi, and placed in a high humidity chamber maintained at 25° C. (77° F.) for eight weeks.

The testing was performed by Dr. David Westenberg, who is an Associate Professor of Biological Sciences at the Missouri University of Science and Technology (formerly known as the University of Missouri-Rolla). Dr. Westenberg described the test results this way: "When applied as directed (two coats) the test composition (with microbicide) treated wood shows no fungal growth after continuous exposure for a period of 8 weeks whereas untreated and non-microbicide (the test composition without microbicide) treated samples showed fungal growth after less than 2 weeks of exposure."

The preferred embodiment comprising titanium dioxide should inherently provide enhanced anti-microbial properties because titanium dioxide is also an anti-microbial agent.

CONCLUSION

While the present invention has been described in terms of a series of preferred embodiments thereof, it is to be appreciated and anticipated that those skilled in the art may readily apply these teachings to other possible variations of the invention. Various changes may be made and equivalents may be substituted for elements thereof without departing from the scope of the invention. Therefore, it is intended that the invention not be limited to the particular embodiments disclosed as the best modes contemplated for carrying out the process of the invention but that the invention will include all embodiments falling within the scope of the appended claims and legal equivalents.

What is claimed is:

1. A tint-free and pigment-free composition made by the process of mixing substances (A), (B), (C), (D), (E), and (F) together in the following volumetric ratios:
   49.8parts substance (A), wherein substance (A) is an all-acrylic polymer dispersion comprising about 50 wt % acrylic polymer and about 50 wt % water;
   about 44.8parts substance (B), wherein substance (B) is water;
   0.25parts substance (C), wherein substance (C) is 2,2,4-trimethyl-1,3-pentanediol monoisobutyrate;
   5.0parts substance (D), wherein substance (D) is a non-ionic, solvent-free, hydrophobically-modified ethylene oxide urethane (HEUR) rheology modifier;
   0.10parts substance (E), wherein substance (E) is a water-based silicone defoamer; and
   0.13parts substance (F), wherein substance (F) is a hydrophobically-modified anionic thickener.

2. A tint-free and pigment-free composition made by the process of mixing substances (A), (B), (C), (D), and (E) together in the following volumetric ratios:
   24.5parts substance (A), wherein substance (A) is an all-acrylic polymer dispersion comprising about 50 wt % acrylic polymer and about 50 wt % water;
   about 73.9parts substance (B), wherein substance (B) is water;
   1.2parts substance (C), wherein substance (C) is an aqueous microbicidal dispersion, wherein the microbicidal agents in the aqueous microbicidal dispersion are 2-n-octyl-4-isothiazolin-3-one, methylbenzimidazole-2-yl-carbamate, and N'-(3,4-dichlorophenyl)-N-N-dimethylurea, and the total concentration of microbicidal agents in the aqueous microbicidal dispersion is 30%;
   0.25parts substance (D), wherein substance (D) is 2,2,4-trimethyl-1,3-pentanediol monoisobutyrate; and
   0.20parts substance (E), wherein substance (E) is a water-based silicone defoamer.

3. A tint-free and pigment-free composition made by the process of mixing substances (A), (B), (C), (D), (E), and (F) together in the following volumetric ratios:
   24.6parts substance (A), wherein substance (A) is an all-acrylic polymer dispersion comprising about 50 wt % acrylic polymer and about 50 wt % water;
   about 72.8parts substance (B), wherein substance (B) is water;
   1.2parts substance (C), wherein substance (C) is an aqueous microbicidal dispersion, wherein the microbicidal agents in the aqueous microbicidal dispersion are 2-n-octyl-4-isothiazolin-3-one, methylbenzimidazole-2-yl-carbamate, and N'-(3,4-dichlorophenyl)-N-N-dimethylurea, and the total concentration of microbicidal agents in the aqueous microbicidal dispersion is 30%;
   0.25parts substance (D), wherein substance (D) is 2,2,4-trimethyl-1,3-pentanediol monoisobutyrate;
   0.01parts substance (E), wherein substance (E) is a fluoro-surfactant solution comprising 35% water-soluble anionic phosphate fluorosurfactant, 20% isopropyl alcohol, and 45% water; and
   1.1parts substance (F), wherein substance (F) is a hydrophobically-modified anionic thickener.

* * * * *